(12) United States Patent
Carothers et al.

(10) Patent No.: US 8,148,265 B2
(45) Date of Patent: Apr. 3, 2012

(54) TWO-STEP HARDMASK FABRICATION METHODOLOGY FOR SILICON WAVEGUIDES

(75) Inventors: Daniel N. Carothers, Oro Valley, AZ (US); Craig M. Hill, Warrenton, VA (US); Andrew T. Pomerene, Leesburg, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 826 days.

(21) Appl. No.: 12/201,807

(22) Filed: Aug. 29, 2008

(65) Prior Publication Data

US 2010/0055906 A1   Mar. 4, 2010

(51) Int. Cl.
*H01L 21/302* (2006.01)
(52) U.S. Cl. ........ 438/692; 438/689; 385/129; 385/131; 216/37
(58) Field of Classification Search .................. 438/689, 438/692; 385/129, 131
See application file for complete search history.

(56) References Cited

U.S. PATENT DOCUMENTS

| | | | |
|---|---|---|---|
| 4,420,258 A | 12/1983 | Burns et al. | |
| 4,547,072 A | 10/1985 | Yoshida et al. | |
| 4,748,617 A | 5/1988 | Drewlo | |
| 4,921,354 A | 5/1990 | SooHoo | |
| 5,165,001 A | 11/1992 | Takagi et al. | |
| 5,281,805 A | 1/1994 | Sauer | |
| 5,371,591 A | 12/1994 | Martin et al. | |
| 5,430,755 A | 7/1995 | Perlmutter | |
| 5,625,636 A | 4/1997 | Bryan et al. | |
| 5,674,778 A | 10/1997 | Lee et al. | |
| 5,703,989 A | 12/1997 | Khan et al. | |
| 5,736,461 A | 4/1998 | Berti et al. | |
| 5,828,476 A | 10/1998 | Bonebright et al. | |
| 5,834,800 A | 11/1998 | Jalali-Farahani et al. | |
| 6,063,299 A * | 5/2000 | Drake et al. .................. 216/24 |
| 6,117,771 A | 9/2000 | Murphy et al. | |
| 6,242,324 B1 | 6/2001 | Kub et al. | |

(Continued)

FOREIGN PATENT DOCUMENTS

EP    0818693 A1    1/1998

(Continued)

OTHER PUBLICATIONS

Lim Michael et al. Journal of Vacuum Science & Technol. B vol. 17(6), (1999), pp. 3208-3211.*

(Continued)

*Primary Examiner* — Nadine G Norton
*Assistant Examiner* — Maki Angadi
(74) *Attorney, Agent, or Firm* — Finch & Maloney PLLC; Neil F. Maloney

(57) ABSTRACT

Techniques are disclosed for efficiently fabricating semiconductors including waveguide structures. In particular, a two-step hardmask technology is provided that enables a stable etch base within semiconductor processing environments, such as the CMOS fabrication environment. The process is two-step in that there is deposition of a two-layer hardmask, followed by a first photolithographic pattern, followed by a first silicon etch, then a second photolithographic pattern, and then a second silicon etch. The process can be used, for example, to form a waveguide structure having both ridge and channel configurations, or a waveguide (ridge and/or channel) and a salicide heater structure, all achieved using the same hardmask. The second photolithographic pattern allows for the formation of the lower electrical contacts to the waveguides (or other structures) without a complicated rework of the hardmask.

20 Claims, 6 Drawing Sheets

U.S. PATENT DOCUMENTS

| | | | |
|---|---|---|---|
| 6,306,722 | B1 | 10/2001 | Yang et al. |
| 6,331,445 | B1 | 12/2001 | Janz et al. |
| 6,387,720 | B1 | 5/2002 | Misheloff et al. |
| 6,400,996 | B1 | 6/2002 | Hoffberg et al. |
| 6,451,712 | B1 | 9/2002 | Dalton et al. |
| 6,477,285 | B1 | 11/2002 | Shanley |
| 6,605,809 | B1 | 8/2003 | Engels et al. |
| 6,677,655 | B2 | 1/2004 | Fitzergald |
| 6,680,495 | B2 | 1/2004 | Fitzergald |
| 6,709,976 | B1 | 3/2004 | Kamin et al. |
| 6,725,119 | B1 | 4/2004 | Wake |
| 6,738,546 | B2 | 5/2004 | Deliwala |
| 6,785,447 | B2 | 8/2004 | Yoshimura et al. |
| 6,795,622 | B2 | 9/2004 | Forrest et al. |
| 6,850,252 | B1 | 2/2005 | Hoffberg |
| 6,861,369 | B2 | 3/2005 | Park |
| 6,936,839 | B2 | 8/2005 | Taylor |
| 6,968,110 | B2 | 11/2005 | Patel et al. |
| 7,006,881 | B1 | 2/2006 | Hoffberg et al. |
| 7,010,208 | B1 | 3/2006 | Gunn, III et al. |
| 7,016,587 | B2 * | 3/2006 | Kubby et al. ............ 385/129 |
| 7,043,106 | B2 | 5/2006 | West et al. |
| 7,072,556 | B1 | 7/2006 | Gunn, III et al. |
| 7,082,247 | B1 | 7/2006 | Gunn, III et al. |
| 7,103,252 | B2 | 9/2006 | Ide |
| 7,139,448 | B2 | 11/2006 | Jain et al. |
| 7,169,654 | B2 | 1/2007 | Zia et al. |
| 7,215,845 | B1 | 5/2007 | Chan et al. |
| 7,218,809 | B2 | 5/2007 | Zhou et al. |
| 7,218,826 | B1 | 5/2007 | Gunn, III et al. |
| 7,259,031 | B1 | 8/2007 | Dickson et al. |
| 7,272,279 | B2 | 9/2007 | Ishikawa et al. |
| 7,315,679 | B2 | 1/2008 | Hochberg et al. |
| 7,333,679 | B2 | 2/2008 | Takahashi |
| 7,348,230 | B2 | 3/2008 | Matsuo et al. |
| 7,356,221 | B2 | 4/2008 | Chu et al. |
| 7,447,395 | B2 | 11/2008 | Montgomery et al. |
| 2002/0039830 | A1 | 4/2002 | Yeh et al. |
| 2003/0020144 | A1 | 1/2003 | Warble et al. |
| 2003/0026546 | A1 | 2/2003 | Deliwala |
| 2003/0183825 | A1 | 10/2003 | Morse |
| 2004/0146431 | A1 | 7/2004 | Scherer et al. |
| 2004/0190274 | A1 | 9/2004 | Saito et al. |
| 2005/0094938 | A1 | 5/2005 | Ghiron et al. |
| 2006/0105509 | A1 | 5/2006 | Zia et al. |
| 2006/0158723 | A1 | 7/2006 | Voigt et al. |
| 2006/0233504 | A1 * | 10/2006 | Hochberg et al. ............ 385/129 |
| 2006/0238866 | A1 | 10/2006 | Von Lerber |
| 2006/0240667 | A1 | 10/2006 | Matsuda et al. |
| 2007/0116398 | A1 | 5/2007 | Pan et al. |
| 2007/0202254 | A1 | 8/2007 | Ganguli et al. |
| 2008/0159751 | A1 | 7/2008 | Matsui et al. |
| 2008/0240180 | A1 | 10/2008 | Matsui et al. |
| 2008/0253728 | A1 * | 10/2008 | Sparacin et al. ............ 385/132 |

FOREIGN PATENT DOCUMENTS

| | | |
|---|---|---|
| EP | 1 067 409 | 1/2001 |
| WO | 9314514 | 7/1993 |
| WO | 0127669 | 4/2001 |
| WO | 0216986 | 2/2002 |
| WO | 2004088724 | 10/2004 |
| WO | 2007/149055 A1 | 12/2007 |

OTHER PUBLICATIONS

Kimmet, "Chapter 6. Integrated Circuit Fabrication Details", 1999, 18 pages.

Office Action dated Jun. 2, 2009 from related matter U.S. Appl. No. 12/201,943 (11 pages).

"Erbium Doped Optical Waveguide Amplifiers on Silicon", P.G. KiK and A. Polman, MRS Bulletin 23(4), 48, Apr. 1998, 7 pages.

Notice of Allowability received in related U.S. Appl. No. 12/201,791, dated Dec. 18, 2009.

Non-Final Rejection from related U.S. Appl. No. 12/201,791, mailed Apr. 24, 2009.

Response to Non-Final Rejection from related U.S. Appl. No. 12/201,791, filed Jul. 22, 2009.

Final Rejection from related U.S. Appl. No. 12/201,791, mailed Sep. 8, 2009.

Response to Final Rejection from related U.S. Appl. No. 12/201,791, filed Nov. 4, 2009.

Soltani et al., "Ultra-high Q planar silicon microdisk resonators for chip-scale silicon photonics", Apr. 16, 2007, vol. 15, No. 8, Optics Express.

PCT International Search Report from related application PCT/US09/55213, mailed Oct. 13, 2009.

PCT Written Opinion from related application PCT/US09/55213, mailed Oct. 13, 2009.

PCT International Search Report from related application PCT/US09/55209, mailed Oct. 20, 2009.

PCT Written Opinion from related application PCT/US09/55209 mailed Oct. 20, 2009.

Pruessner et al., "InP-Based Optical Waveguide MEMS Switches with Evanescent Coupling Mechanism", Journal of Microelectromechanical Systems, vol. 14, No. 5, Oct. 2005.

May et al., "Integrated Process for Silicon Nitride Waveguide Fabrication", IBM Technical Disclosure Bulletin, vol. 33, No. 2, Jul. 1990.

Matsushita et al., "Narrow CoSi2 Line Formation on SiO2 by Focused Ion Beam", IEEE Xplore 1999.

"Process Integration", Cobalt Self-aligned Silicide Process, Chapter 13.

Liu et al., "Design of Monolithically Integrated GeSi Electro-absorption Modulators and Photodetectors on an SOI Plaform", Optics Express 623, vol. 15, No. 2, Jan. 22, 2007.

Fijol et al., "Fabrication of Silicon-on-insulator Adiabatic Tapers for Low Loss Optical Interconnection of Photonic Devices".

Yap et al., "Integrated Opteoelectronic Circuits with InP-based HBTs", Proceedings of SPIE, vol. 4290, 2001.

Roth, "Electroabsorption Modulators for CMOS Compatible Optical Interconnects in III-V and Group IV Materials", Aug. 2007, (part 1 of 3).

Roth, "Electroabsorption Modulators for CMOS Compatible Optical Interconnects in III-V and Group IV Materials", Aug. 2007, (part 2 of 3).

Roth, "Electroabsorption Modulators for CMOS Compatible Optical Interconnects in III-V and Group IV Materials", Aug. 2007, (part 3 of 3).

Kimberling et al., "Electronic-photonic Integrated Circuits on the CMOS Platform".

Chao et al., "Analysis of Temperature Profiles of Thermo-optic Waveguides", Fiber and Integrated Optics, vol. 33.

Okyay et al., "Silicon Germanium CMOS Optoelectronic Switching Device: Bringing Light to Latch", IEEE Transactions on Electron Devices, vol. 54, No. 12, Dec. 2007.

Mcaulay et al., "All-optical Switching and Logic with an Integrated Optic Microring Resonator", Proc. of SPIE vol. 5814.

* cited by examiner

TWO-STEP HARDMASK FABRICATION METHODOLOGY FOR SILICON WAVEGUIDES

RELATED APPLICATIONS

This application is related to U.S. Pat. No. 7,693,354, filed Aug. 29, 2008, and titled "Salicide Structures for Heat-Influenced Semiconductor Applications" which is herein incorporated by reference in its entirety.

FIELD OF THE INVENTION

The invention relates to semiconductors, and more particularly, to a fabrication methodology for silicon waveguides.

BACKGROUND OF THE INVENTION

There are number of waveguide structures that can be used to realize an optical waveguide in silicon, such as ridge and channel waveguides. In such structures, light is typically guided in a high refractive index material (typically referred to as the waveguide core) that is surrounded by a lower index material (typically referred to as the waveguide cladding).

A channel waveguide is usually formed by depositing a high refractive index core material on a low refractive index bottom cladding material. Excess of the high refractive index material to either side of the channel is removed down to the underlying oxide using standard lithography processing (i.e., mask and etch). Once the channel is formed, a low refractive index upper cladding is deposited around the channel. The mismatch in refractive index between the core and the cladding effectively operates to contain radiation within the channel of the waveguide.

A ridge waveguide is a variation on the channel waveguide, wherein the high refractive index core material is only partially etched back to the underlying oxide, leaving a so-called slab to either side of the ridge. This lowers the in-plane refractive index contrast, which generally decreases scattering loss.

In some applications, both ridge and channel type waveguide structures are used. In such cases, the slab of the ridge waveguide is etched after the channel waveguides are fully formed. In particular, a small window in resist is opened to etch the small slab area, since other finished waveguide structures have to be protected from the etching process associated with forming the slab. This subsequent slab etch processing generally leads to large etching non-uniformities due to uneven plasma loading and increased sidewall roughness of waveguides. Moreover, the process typically does not yield repeatable results.

What is needed, therefore, are techniques that facilitate the fabrication of silicon-based circuitry including channel and ridge waveguide structures. In a more general sense, there is a need for more efficient techniques for fabricating semiconductors including waveguide structures.

SUMMARY OF THE INVENTION

One embodiment of the present invention provides a method of making a silicon waveguide structure. The method includes depositing a hardmask layer on a substrate having a silicon layer on an oxide layer, and then etching the hardmask layer to provide a patterned hardmask defining patterns for a waveguide and at least one other structure. The method continues with etching partway down the silicon layer with the patterned hardmask in place to form at least part of the waveguide and the at least one other structure. The method further includes patterning a slab of the at least one other structure (e.g., using photoresist or other suitable mask technology), and etching the remainder of the silicon layer down to the oxide layer with the patterned hardmask in place, thereby defining the slab of the at least one other structure and more of the waveguide. The at least one other structure can be or otherwise include, for example, a ridge waveguide or a salicide heater structure (or any other device that can be formed on the substrate). In one example embodiment, the hardmask layer includes a top layer that acts as a hardmask and polish stop for chemical-mechanical planarization (CMP), and a bottom layer that acts as an etch stop for subsequent removal of the top hardmask layer. In one such case, the top layer is a nitride layer and the bottom layer is an oxide layer. In another such embodiment, etching the hardmask layer to provide a patterned hardmask is performed with a pattern of photoresist in place, and etching partway down the silicon layer is carried out with both the patterned hardmask and photoresist in place. In one such case, prior to patterning the slab, the method further comprises removing the photoresist used to pattern the hardmask. In another embodiment, depositing the hardmask layer comprises depositing a bottom layer of silicon oxide, and then depositing a top layer of nitride. In one such case, the waveguide is a channel waveguide and the at least one other structure is a ridge waveguide, and the method includes depositing a cladding layer over the ridge and channel waveguides, and planarizing the cladding layer using a CMP process, wherein the CMP process stops on or partially removes the top layer of nitride. The method may include removing the patterned hardmask using an etch process (e.g., removing the top hardmask layer using phosphoric acid, and removing the bottom hardmask layer with hydrofluoric acid; other suitable hardmask removal schemes can be used, depending on the hardmask composition). The method may include continuing with one or more CMOS based fabrication processes. In some embodiments, etching the hardmask layer to provide a patterned hardmask and etching partway down the silicon layer are carried out as a single etching process.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
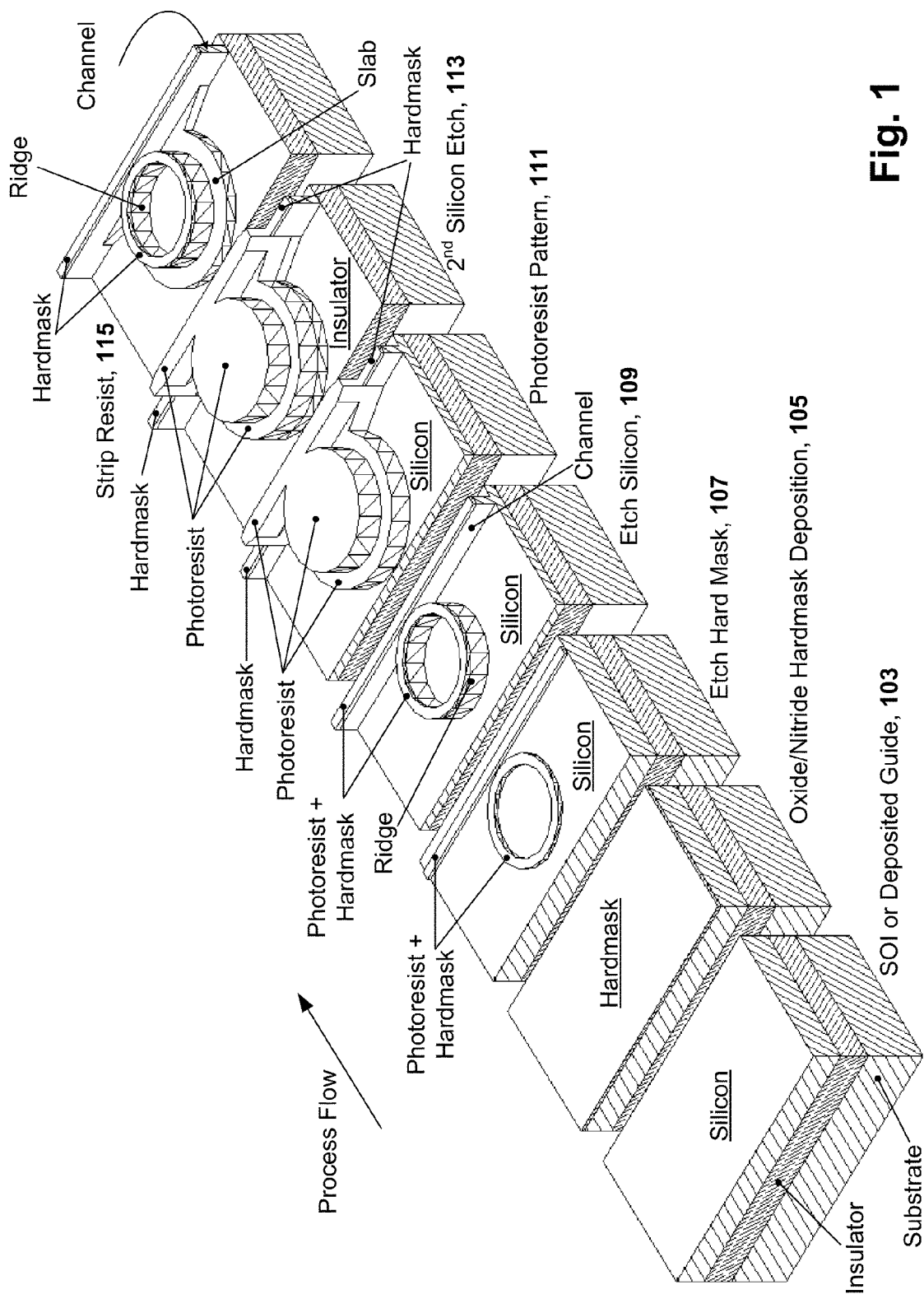
FIG. 1 illustrates a method of making a silicon waveguide structure, in accordance with an embodiment of the present invention.

Techniques are disclosed for efficiently fabricating semiconductors including waveguide structures. In one particular example case, the techniques facilitate the fabrication of a silicon high refractive index contrast waveguide with both channel and ridge type configurations. In another particular example case, the techniques facilitate the fabrication of a silicon high refractive index contrast waveguide with (e.g., channel or ridge configuration) and a salicide heater structure for provided phase control in accordance with thermo-optic effect.

General Overview

As previously explained, conventional fabrication techniques for a ridge waveguide generally involve the partial etching of a slab portion to form the ridge. In a waveguide including channel and ridge type configurations, this partial etch process for forming the ridge into the silicon is delayed until after all of the channel waveguides are completely formed, which generally leads to large etching non-uniformities and does not yield repeatable results. Such conventional fabrication techniques also generally lead to mis-alignment issues where slab and channel waveguides are intended to couple into each other.

To address such issues, a two-step hardmask technology is provided herein that enables a stable etch base within semiconductor processing environments, such as the CMOS fabrication environment and other suitable fabrication environments. The process is two-step in that there is deposition of a two-layer hardmask, followed by a first photolithographic pattern, followed by a first silicon etch, then a second photolithographic pattern, and then a second silicon etch. The process can be used, for example, to form a waveguide structure having both ridge and channel configurations, all achieved using the same hardmask. The second photolithographic pattern allows for the formation of the lower electrical contacts to the waveguides without a complicated rework of the hardmask (i.e., the hardmask serves as the channel waveguide mask through multiple etches, preserving the sidewall of the waveguide).

In more detail and in accordance with one embodiment, the two-step process includes deposition of a two-layer hardmask of oxide and nitride over a silicon-on-insulator (SOI) or deposited guide, and then etching the active area and waveguide pattern into the hardmask. As is known, an "active area" is a semiconductor term which defines the areas where electronic components (e.g., MOSFETs or other such gate-level components and modulators, salicide structures, etc) will be located. This standard layer is combined into the waveguide layer, and both layers are processed as one in an efficient manner that avoids etching non-uniformities associated with conventional techniques. This first etch is a partial etch and leaves a prescribed amount of silicon left on top of the bottom oxide, so that remaining silicon can be used for the slab region of forthcoming modulators. The hardmask remains on top of the channel waveguide structure, and acts as an etch mask again during the waveguide ridge mask etch.

The waveguide ridge mask etch is effectively the second etch in the two-step hardmask waveguide process. In more detail, this second etch is used to define the edges of the ridge waveguide slabs (or other purposeful slab), and completes the partial etch (first etch step) of the thinned silicon down to the bottom oxide, thereby forming a finished channel waveguide. The exposed thinned slab areas are then ready for selective implants for the modulators prior to the oxide deposition of a shallow trench isolation (STI) fill and polish. STI is a standard CMOS process step, and is optional depending on the given application.

In addition to its ability to maintain a stable etch base, the two-layer hardmask may serve other purposes. For instance, in some embodiments the hardmask operates to control the penetration depth and configuration of ion implants used to form optical modulators and make contact to optical detectors. It also allows for efficient formation of complex structures including waveguides and other structures (such as lateral heaters in thermo-optic circuits). The hardmask also allows integration within a chemical mechanical polishing (CMP) based process. In more detail, and in accordance with one particular embodiment, a top silicon nitride layer acts as the hardmask and as a polish stop layer for CMP, thereby preserving waveguide qualities not only across the wafer, but from wafer to wafer. After CMP, the nitride layer can be removed, for example, using a phosphoric acid based etch that is selective to bottom hardmask layer of oxide. Removing the nitride allows for recovery of the original perfect waveguide, and continuation with CMOS based fabrication processes. The two-layer hardmask two-step etch technology also enables a number of electronic components (e.g., CMOS or other) having improved operation.

Manufacturing Methodology

FIG. 1 illustrates a method of making a silicon waveguide structure, in accordance with an embodiment of the present invention. This process can be used, for instance, to form channel and/or ridge waveguide structures along with other circuit features, such as a salicide heater structure described in the previously incorporated U.S. Pat. No. 7,693,354. Note, however, that the present invention is not intended to be limited to thermo-optic applications, and may alternatively be used with other semiconductor devices and/or processes. As can be seen, the process flow includes steps 103 through 115, each of which will be discussed in turn, along with various corresponding features. This example flow only shows processing up to the second waveguide etch. Additional example processing thereafter will be discussed with reference to FIG. 4.

In this example embodiment, the process begins at 103 with an SOI wafer having silicon on a thick buried oxide or other suitable insulator material layer, or a grown film of amorphous-silicon, polysilicon or nanosilicon. In general, growing on the flattest possible surface, with the highest quality underlying oxide, is beneficial. In some embodiments, a high density plasma, chemical vapor deposited (HDP-CVD) silicon dioxide is employed for this purpose. The HDP-CVD approach provides a high degree of control over the uniformity of the oxide cladding. The underlying substrate below the insulator and silicon layers can be, for example, silicon, although other suitable substrate materials can be used, such as gallium arsenide, indium phosphate, and quartz, sapphire, depending on the materials being deposited and giving consideration to factors such as thermal coefficients of expansion. Note that the silicon, insulator, and substrate layers are not labeled in every step in the example process flow shown, but remain constant through the entire process flow unless otherwise indicated (e.g., the silicon layer is etched or otherwise removed at times).

The method continues at 105 with hardmask deposition, which in this example case involves the deposition of an oxide/nitride hardmask, wherein a bottom layer of oxide is deposited followed by a top layer of nitride. Each of these two hardmask layers ranges, for example, from about 50 Angstroms to 1200 Angstroms. The two-layer hardmask allows integration within a CMP based process. In more detail, and in accordance with one particular embodiment, a top nitride layer acts as the hardmask and polish stop layer for CMP. The bottom oxide layer acts as a stop for a subsequent removal of the top nitride layer, thereby preserving circuit (e.g., waveguide) qualities not only across the wafer, but from wafer to wafer.

It is desirable to control the thickness of the slab part of the ridge waveguide to facilitate electrical contact to various electro-optical devices fabricated in the ridge waveguide. To accommodate this desire, two etches are used (i.e., two-step etch process); however, it is not desirable to have to re-pattern the waveguides, as this will allow various photolithographic errors to create variations in the waveguide structures that can introduce high loss. The method addresses this issue, and continues at 107 with etching (or patterning) the hardmask, so as to provide one or more waveguide patterns. The patterned hardmask features shown in the example embodiment of FIG. 1 form a waveguide ridge and waveguide channel. Standard photoresist and etch techniques can be used to pattern the hardmask (e.g., the hardmask not covered by photoresist can be etched away). Note in this example embodiment, that the photoresist forming the pattern is left on top of the hardmask (even after the hardmask is etched) for subsequent processing.

The method continues at 109 with the first part of a two-step etch process (not counting the initial etch used in patterning the hardmask at 107). In more detail, the first etch etches partway down the silicon layer (of the SOI) with the patterned hardmask and the initial photoresist in place. The photoresist is left in place as it is undesirable to remove the wafer from vacuum once the etch has begun, as such removal can lead to undesired final etch profiles or micro-mask defects. In addition, removal of the photoresist can further alter the surface. Thus, etching at 107 and 109 can be combined into the initial etch process, so as to first etch the patterned hardmask and then the unmasked silicon, in the same tool, without exposing the wafer to air. Alternatively, etching at 107 and 109 can be separate etch processes depending on factors such as the hardmask material employed. In general, etching at 107 and 109 can be implemented with any etch process suitable to remove the targeted portions of exposed hardmask and unmasked silicon. This first etch (up to 109) is to a pre-determined depth, sufficient for optical transport or electrical contact.

After the first etch, the wafer can be removed from the tool and the initial photoresist used to pattern the hardmask is removed. The hardmask itself, however, is left on to preserve the waveguide (or other circuitry) shape and uniformity for the following second etch. The method may continue with patterning any lower features, if so desired, and as discussed in more detail with reference to FIG. 4. Note that hardmask of oxide/nitride remains in place on the channel waveguide.

Figure 4:
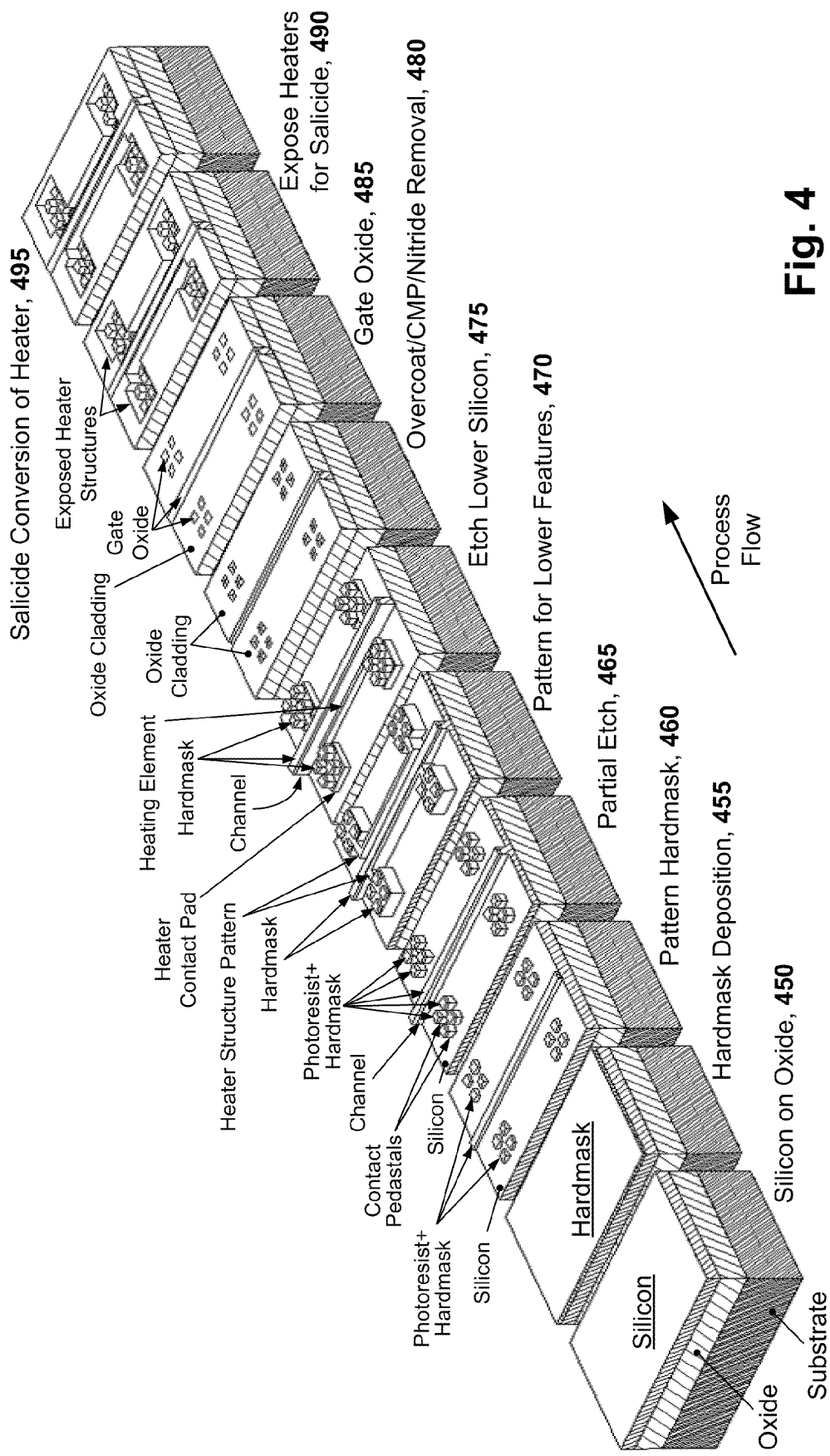
FIG. 4 illustrates a method of making the waveguide structure shown in FIG. 3, in accordance with an embodiment of the present invention.

Once lower features are patterned (if any), the second etch of the two-step etch process can be carried out. In the example flow shown in FIG. 1, the second etch defines the shape, or form of the ridge waveguide slab. In more detail, and with reference to the specific embodiment shown in FIG. 1, the second etch does not have the same high tolerances as the first etch; thus, a photoresist process can be used. In this process, the slab shape is defined with photoresist as shown at 111, and the thin silicon slab is then etched at 113. Standard photoresist and etch techniques can be used to pattern the slab of the ridge waveguide (e.g., the silicon not covered by photoresist or hardmask can be etched away, thereby forming the slab). Once the second etch is finished and the slab of the ridge waveguide is formed, the resist can be stripped or otherwise removed, as shown at 115. At this point, the channel and ridge waveguide structures can be seen, including the newly formed slab. Further note that each of the channel and ridge waveguides are covered with the hardmask, should any subsequent processing be desired (as shown in FIG. 4). Subsequent processing may include, for example, deposition of a thick oxide cladding (over the waveguide structures) using an HDP-CVD method to provide uniformity of the cladding index, and then planarizing the oxide surface via a CMP process. In the fabrication of CMOS FETS, this planarizing process is commonly used after shallow trench isolation fill. The polish stops on the nitride. The nitride part of the hardmask can then be removed with a wet etch (e.g., using phosphoric acid or other suitable etchant, or other suitable removal process). From this point, standard semiconductor fabrication (e.g., CMOS) flow can be used to provide features such as additional oxide layers, via structures, and corresponding metal contacts.

The hardmask etch approach as described herein provides a number of benefits. For instance, it allows the waveguide integrity (and other circuit integrity) to be controlled and maintained across multiple etches (i.e., the hardmask acts as a constant pattern for multiple etch steps). In addition, the hardmask process effectively controls the lateral profile of the circuit by controlling the way the effluent etch products develop, and also provides a means of using CMP technologies to planarize the wafer without modifying the shape of the waveguide (or other circuitry). The evolution of the etch by-product gasses is controlled by moving organic resists in the second silicon etch farther away from the channel waveguides, allowing control of the development of various gas chemistries involving oxygen and hydrogen that evolve as the photoresist is consumed. The nitride is resistant to the CMP action, and can be selectively removed, with respect to oxide, using a wet etch (e.g., phosphoric acid based etch that is selective to the oxide). A CMP process can be used, for example, to planarize cladding that is deposited after step 115, which allows for integration of the resulting waveguide structure into a standard CMOS process or the development of 3D waveguiding structures. One such process will be discussed with reference to FIG. 4. Removing the nitride layer of the two-layer hardmask allows for recovery of the formed waveguide structure and continuation with CMOS based fabrication processes.

Figure 2A:
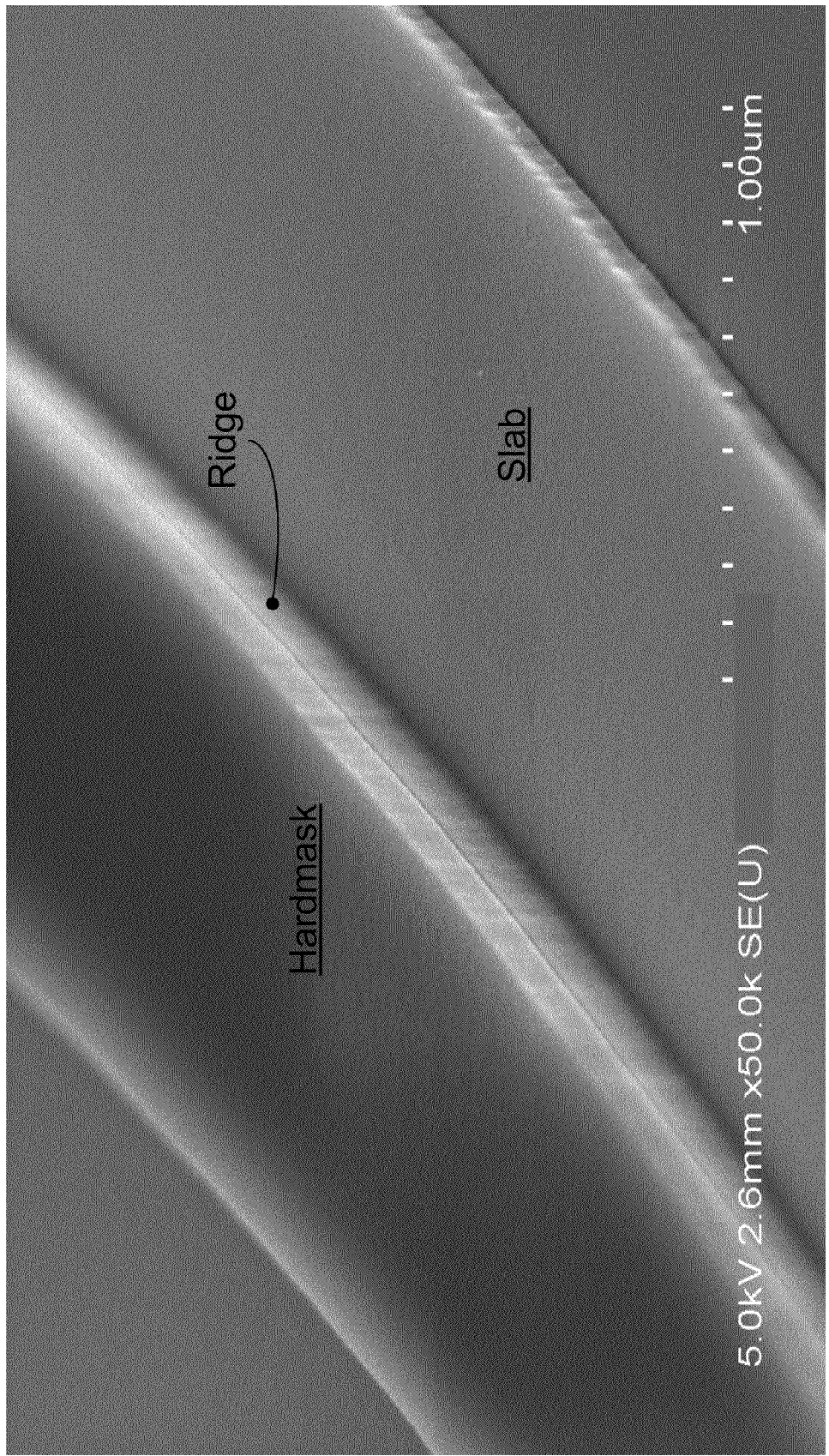
FIG. 2a is an image showing a perspective view of a ridge waveguide fabricated in accordance with an embodiment of the present invention.
Figure 2B:
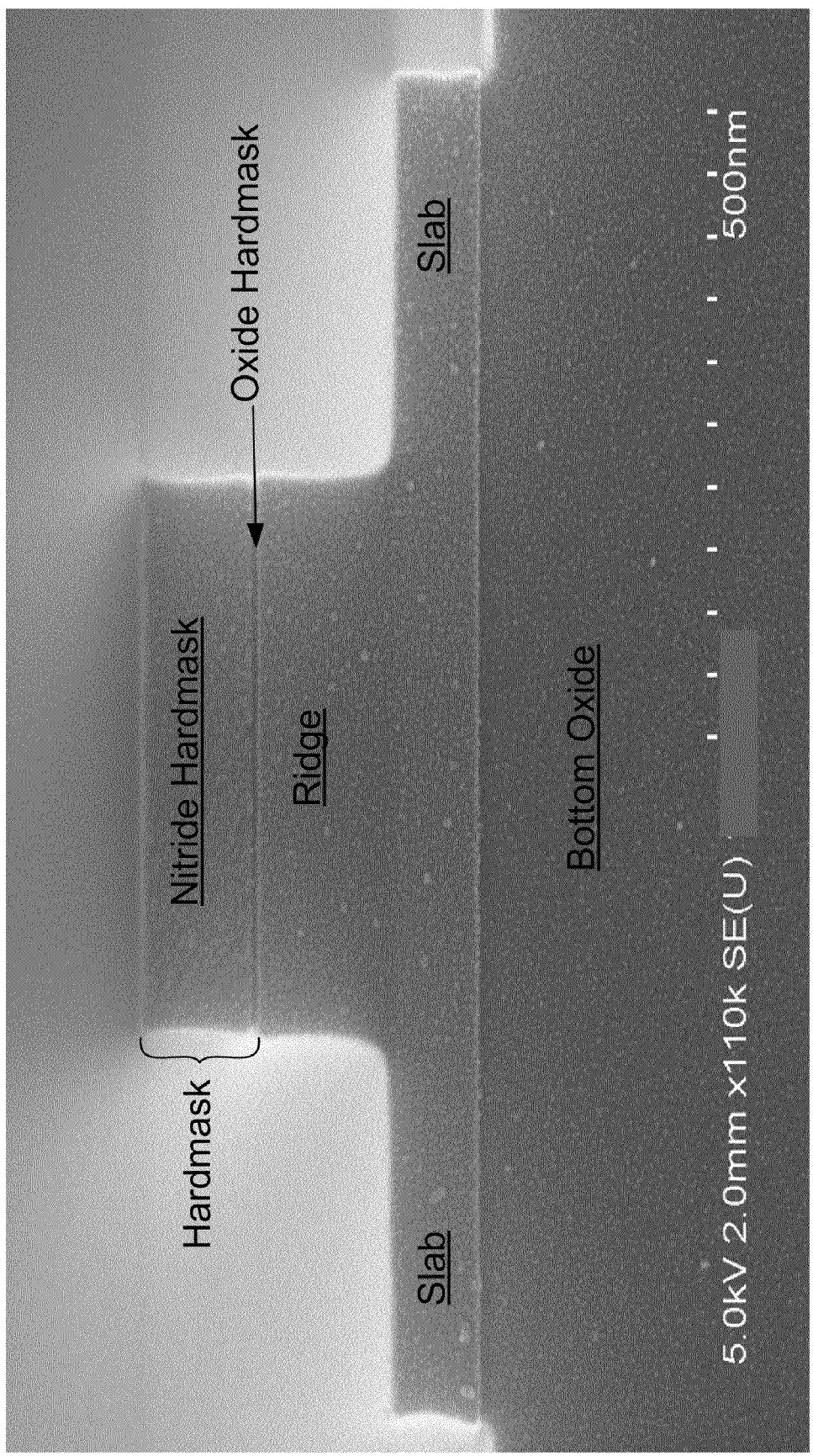
FIG. 2b is an image showing a cross-section side view of a ridge waveguide fabricated in accordance with an embodiment of the present invention.
Figure 2C:
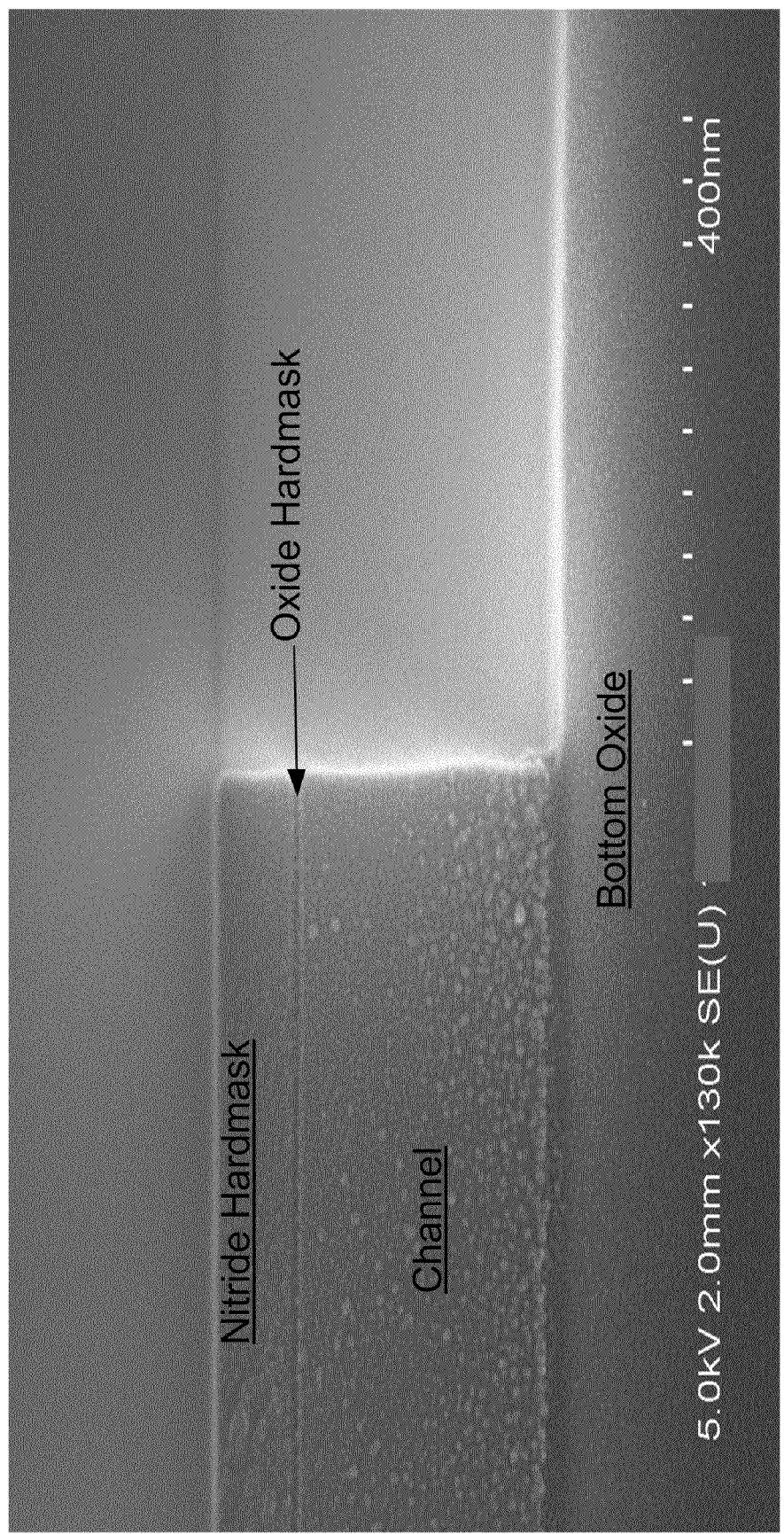
FIG. 2c is an image showing a cross-section side view of a channel waveguide fabricated in accordance with an embodiment of the present invention.

FIG. 2a is an image showing a perspective view of a ridge waveguide fabricated in accordance with an embodiment of the present invention. The image was created with a scanning electron microscope (SEM) to captures details at the submicron level. The curved ridge and slab portions of the ridge waveguide structure can be seen. This image was taken after the second silicon etch was performed to form the slab and ridge portions of the ridge waveguide. Note that the hardmask is still in place on top of the ridge. FIG. 2b is a SEM image showing a cross-section side view of a ridge waveguide fabricated in accordance with an embodiment of the present invention. This image was taken after the second silicon etch was performed to form the slab and ridge portions of the ridge waveguide. Note the hardmask is still in place on top of the ridge. Also clearly shown in FIG. 2b are the nitride and oxide layers making up the hardmask. The bottom oxide is the insulator of the SOI wafer. FIG. 2c is a SEM image showing a cross-section side view of a channel waveguide fabricated in accordance with an embodiment of the present invention. This image was taken after the second silicon etch was performed to form the slab and ridge portions of the ridge waveguide. Because there was no photoresist patterned proximate to the channel waveguide, the silicon was removed down to the underlying oxide layer, thereby further defining the channel. Note the hardmask is still in place on top of the channel, and that the nitride and oxide layers making up the hardmask are also clearly shown.

Thermo-Optic Circuit

Figure 3:
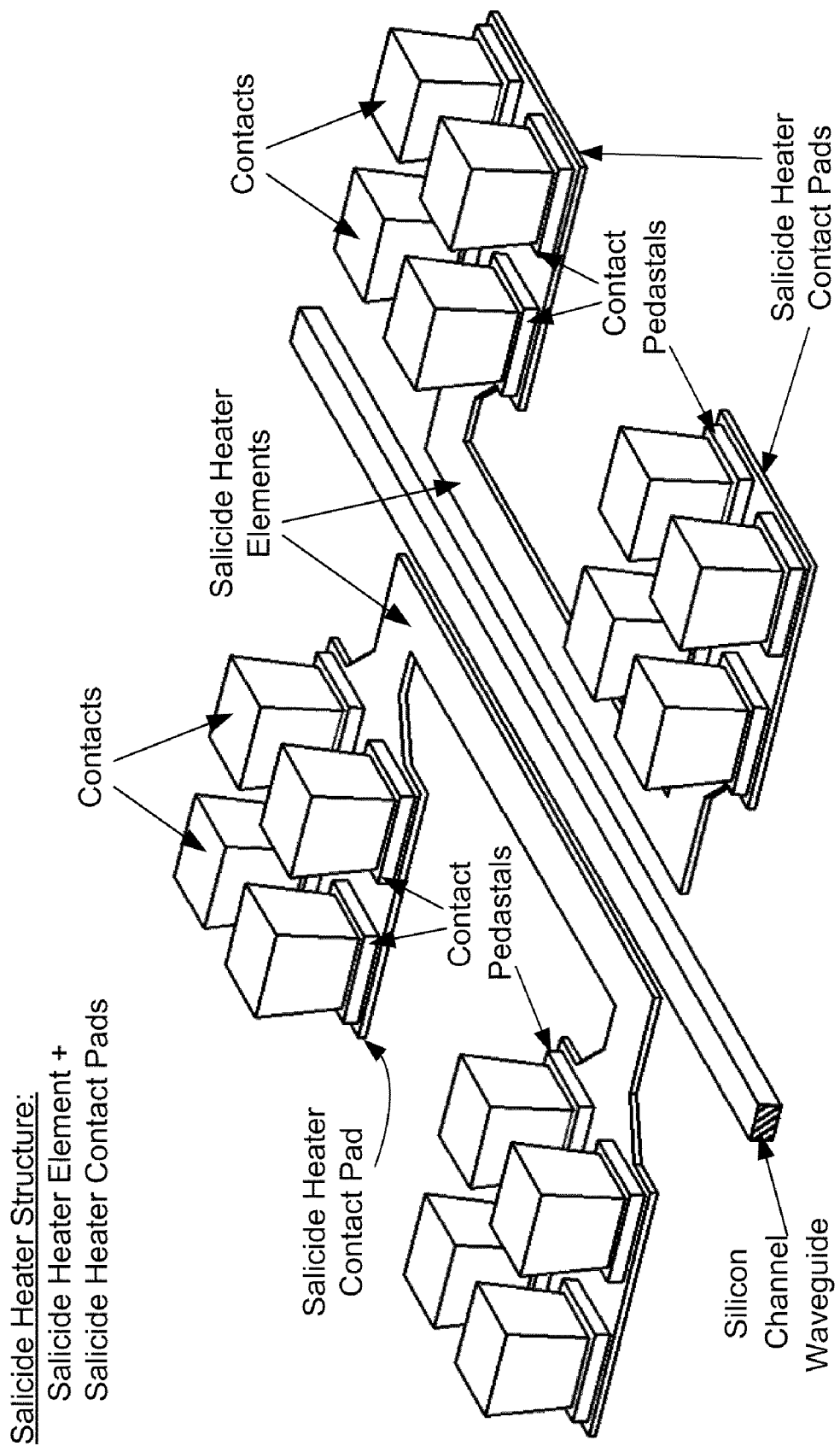
FIG. 3 is a perspective view of an optical waveguide circuit fabricated in accordance with an embodiment of the present invention.

FIG. 3 is a perspective view of an optical waveguide circuit fabricated in accordance with an embodiment of the present invention. As can be seen, the thermo-optic circuit includes a silicon channel waveguide and lateral salicide heaters disposed on each side of the silicon channel waveguide. Each salicide heater includes an elongated narrow portion that runs along side the channel waveguide, as well as wider pad portions upon which are formed a number of contact pedestals and the corresponding metal contacts. Vias can be used to couple the contact metal to the salicide heater element. This optical waveguide circuit can be efficiently fabricated using the techniques described herein at FIGS. 1 and 4.

As is known, a silicon channel waveguide is a three dimensional silicon waveguide formed and buried in a dielectric media on a silicon substrate. The waveguide has a core that is surrounded by a cladding, where the cladding material typically has a refractive index much lower than that of the core material. This arrangement, sometimes referred to as a silicon high index contrast (Si-HIC) waveguide, operates to confine light in a target wavelength range within the waveguide structure, thereby allowing the light to propagate transversely along the core (or channel). The peak optical intensity resides in the core. A channel waveguide is particularly well-suited for allowing higher selective confinement of a TE or TM modes.

As is further known, a channel waveguide can be fabricated using a conventional step-by-step semiconductor processing, including deposition of lower clad layer, deposition of core layer, core etch, deposition of upper clad layer, deposition of metal layer, and metal etch. In more detail, a lower clad layer is deposited on the silicon substrate, followed by deposition of a core layer ($n_{clad}$ is lower than $n_{core}$, where n is the index of refraction). A channel waveguide pattern is then applied to the core layer using standard photolithography techniques and the channel is formed (e.g., using ultraviolet masking and reactive ion etching). During the formation process, material around the channel waveguide structure is removed thereby effectively leaving walls (so-called ribs) extending from the substrate. The structure is then covered by an upper clad layer, typically having the same index of refraction as the lower clad layer.

The term salicide is short for self-aligned silicide, and refers to a semiconductor process for forming electrical contacts between active regions (e.g., source, drain, gate of transistor) a semiconductor device and its interconnect structure (e.g., semiconductor device pins or pads), typically using MOS and CMOS technologies. In general, a conventional salicide process for forming the contacts of such devices involves the heat-induced reaction in the active regions of the semiconductor device of a thin metal film that is in direct contact with an underlying silicon substrate of the device. In more detail, a typical salicide process begins with deposition of a thin transition metal layer over a fully formed and patterned semiconductor device on a substrate. Example transition metals suitable for use in salicide processes include cobalt, tungsten, nickel, titanium, and platinum. The substrate upon which the semiconductor device is formed and the thin metal film is deposited is then heated, causing the thin film of transition metal to react with the underlying silicon in the active regions of the device (e.g., source, drain, gate of transistor), thereby forming a low-resistance transition metal silicide. The temperature can vary, but is generally set to ensure proper annealing without being so high as to damage the formed semiconductor device. Following this annealing process, any excess transition metal can be removed (e.g., conventional etching process), thereby leaving salicide contacts in the active regions of the device. The resulting contacts are essentially a compound of the metal and substrate (e.g., $CoSi_2$, $TiSi_2$, etc).

In accordance with some embodiments of the present invention, a salicide process is used to form salicide heating elements. The salicide heaters allow for greater control over resistivity and uniformity, such that the heaters can operate at CMOS voltage levels (e.g., 0-3.3 volts). In addition, the salicide heaters allow larger temperature fluctuations. As can be seen in this example embodiment, the salicide heaters do not require shared physical modifications to the waveguide. Nor do the salicide heaters employ any ion implantation. Rather, the heaters are free-standing salicide structures, which can be formed using a combination of CMOS and photonic processing steps. In this sense, the heater structure is distinct from the waveguide structure (i.e., the heater is not embedded in the cladding or core materials making up the waveguide, or otherwise in physical contact with the waveguide). Such free-standing salicide heaters allow the index of refraction variation to be preserved (i.e., uniformity of the refractive index for the cladding all the way around the waveguide).

In accordance with one particular embodiment, the salicide heaters are formed using cobalt as the transitional thin film metal, thereby resulting in cobalt salicide ($CoSi_2$) structures that are the result of a combination of CMOS and photonic processing steps. The salicide heaters allow efficient coupling of thermal energy by allowing closer placement of the heater to waveguide, thereby keeping the waveguide below the modal field. This also enables lower power operation and higher speed operation, as the salicide heater does not require as great a thermal load to dissipate into the bulk dielectric. The heater thickness can vary as needed, depending on factors such as power and duration and/or frequency of heating cycles, but in one particular embodiment ranges from about 80 Angstroms to 1000 Angstroms. Note, however, with the techniques described herein, any suitable thicknesses can be used up to the full thickness of the waveguide. The elongated portions of the salicide heaters running proximate the waveguide can be, for instance, within 0.5 microns (or farther) of the waveguide channel, without impeding the effective index variation. In contrast, note that conventional thermo-optic heater designs are typically required to be positioned at least 3.0 microns from the waveguide structure (due to their larger thermal profile). In addition, conventional thermo-optic heater designs generally include a relatively thick structure and are formed in the waveguide having bulk properties.

The metal contacts allow power to be applied to the salicide structure, which in turn generates heat for inducing the desired thermo-optic effect. In the application depicted in FIG. 3, radiation traveling in the waveguide is phase shifted by the localized heat from the salicide heaters, and in accordance with the thermo-optic effect. Numerous schemes can be used to apply the requisite power to obtain the desired waveguide phase response (e.g., ranging from simple heater power switching schemes to feedback with sensing schemes that use real-time adjustments to the applied heater power to get the desired phase response out of the waveguide). Additional details with respect to the salicide structures can be found in the previously incorporated U.S. Pat. No. 7,693,354.

In the particular example of FIG. 3, there are four contact pedestals and corresponding contacts per pad portion. The contact pedestals provide an increased thickness to the pad portion of the heater, so contact vias can be coupled thereto without damaging the pad portion. Another embodiment may simply have, for example, one contact on each contact pad portion, and/or a thicker heater contact pad portion that does not require contact pedestals. In short, any number of contact configurations can be used, so long as power can be delivered to the heater element. Example metals suitable for use in forming the contacts include gold, cobalt, tungsten, nickel, titanium, and platinum. The contact metal may be the same as the metal used to make the salicide heater, but it need not be the same. In one particular embodiment, the heaters are made with cobalt and the contacts (and vias) are made with tungsten.

Manufacturing Methodology with Salicide Structure

FIG. 4 illustrates a method of making the waveguide structure shown in FIG. 3, in accordance with an embodiment of the present invention. This process can be used, for instance, to form a channel and/or ridge waveguide along with the salicide heater structures. Recall, however, the present invention is not intended to be limited to thermo-optic applications, and may alternatively be used to make silicon waveguide structures in a number of applications. As can be seen, the process flow includes steps 450 through 495, each of which will be discussed in turn, along with various corresponding features.

In this example embodiment, the process begins at 450 with an SOI wafer having a thick buried oxide (e.g., silicon-on-oxide, as shown in this example, or other suitable insulating material layer), or a grown film of amorphous-silicon, polysilicon or nanosilicon. As previously explained, growing on the flattest possible surface, with the highest quality underlying oxide, is beneficial. The previous discussion with respect to HDP-CVD equally applies here. The underlying substrate can be, for example, silicon, although other suitable substrate materials can be used, such as gallium arsenide, indium phosphate, and quartz, sapphire, depending on the materials being deposited and giving consideration to factors such as thermal coefficients of expansion. Note that the silicon, oxide, and insulator layers are not labeled in every step in the example process flow shown, but remain constant through the entire process flow unless otherwise indicated (e.g., the silicon layer is etched or otherwise removed at times).

The method continues at 455 with hardmask deposition, which one example case involves the deposition of an oxide/nitride hardmask, wherein a bottom layer of oxide is deposited followed by a top layer of nitride. Each of these two hardmask layers ranges, for example, from about 50 Angstroms to 1200 Angstroms. The two-layer hardmask allows integration within a CMP based process. As previously explained, and in accordance with one particular embodiment, a top nitride layer acts as the hardmask and polish stop layer for CMP. The bottom oxide layer acts as a stop for a subsequent removal of the top nitride layer, thereby preserving circuit (e.g., waveguide and heater) qualities not only across the wafer, but from wafer to wafer. The previously discussed benefits provided by the hardmask etch approach as described herein are equally applicable here.

The process continues at 460 with patterning the hardmask. The patterned hardmask features shown in the example embodiment of FIG. 4 form a waveguide channel as well as contact pedestals (also shown in FIG. 3) that are used to provide good electrical contact, by keeping all of the subsequent etches to the same depth. Standard photoresist and etch techniques can be used to pattern the hardmask (e.g., the hardmask not covered by photoresist can be etched away). Note in this example embodiment, the photoresist forming the pattern is left on top of the hardmask (even after the hardmask is etched) for subsequent processing. Further note that, in some cases, if the pedestals are not used, the contact vias can be etched to two different depths; however, vias at the shallowest etch level may get over etched, or the lower via holes may not get etched enough (if trying to preserve the shallower vias). Thus, consideration of such factors can be used in determining whether to employ the contact pedestals.

The method continues at 465 with the first part of a two-step etch process (not counting the initial etch used in patterning the hardmask). In more detail, the first etch etches partway down the silicon layer (of the SOI) with the patterned hardmask and the initial photoresist in place. This partial etch of the silicon layer at 465 may be a continuation of the initial etch used to pattern the hardmask at 460, or may be a separate etch process depending on factors such as the hardmask material employed. In general, any etch process suitable to remove the targeted portions of exposed hardmask and silicon can be used. In one specific embodiment, the first etch allows the hardmask to be etched, and then the silicon, in the same tool, without exposing the wafer to air. This first etch is to a predetermined depth, sufficient for optical transport or electrical contact.

After the first etch, the wafer can be removed from the tool and the initial photoresist used to pattern the hardmask is removed. The hardmask itself, however, is left on to preserve the waveguide (and other circuitry) shape and uniformity for the following second etch. The method continues at 470 with patterning the lower features. In this example embodiment shown in FIG. 4, the patterned lower features form salicide heater structures (also shown in FIG. 3) that are used to provide heat to the waveguide structure for thermo-optic effect. There are two heater structures included in this example embodiment, each having an elongated heating element portion with two heater contact pads at each end. Standard photoresist and photolithographic techniques can be used to pattern the lower features heaters. Note that hardmask of oxide/nitride remains in place on the channel and contact pedestals.

Once the lower features are patterned, the second etch of the two-step etch process can be carried out. In the example, the second etch at 475 defines the shape, or forms of the heater structures. In more detail, and with reference to 475 of the example case of the salicide heaters shown in FIG. 4, a heating element is defined that is separated from the waveguide, yet physically close in terms of offset. This heating element feature (or slab) along with its corresponding contact pads at each end, are then salicided in a later step to form the heater structure.

After the second waveguide etch, the wafer can be prepped for subsequent processing, and in one example case, is put through an RCA clean. The method then continues at 480, where a thick oxide overcoat or cladding is deposited. In one such embodiment, the oxide coat is provided using an HDP-CVD silicon dioxide method, which provides uniformity of the cladding index. Step 480 further includes a CMP polishing process to planarize the deposited oxide surface. This planarization provides a planar surface suitable for the formation of items such as CMOS field effect transistors (FETs), and for the fabrication of the high performance metal interconnects. The planarization/polish portion of step 480 stops on the nitride of the hardmask. The nitride hardmask can then be removed, for example, with a wet etch (e.g., using phosphoric acid). The method continues at 485 with deposition of the gate oxide (over the contacts and waveguide channel).

The method continues at 490 with exposing the heater, so the salicide process can be carried out. Standard photoresist and etch techniques can be used to carry out this step (e.g., the oxide not covered by photoresist or hardmask can be etched away). At 495, the salicide process is carried out. In general, this salicide process includes depositing a metal, heating the substrate to react the substrate material with the metal to form the salicide heater structure proximate the waveguide, and then etching away any excess or unreacted metal, thereby leaving the salicide heaters proximate the waveguide structure. The temperature of the heating (annealing) process can be, for example, in the range of 600° C. to 900° C. In one specific example embodiment, the heating step is carried out in two different processing steps, with an etching step executed in between the two annealing steps and then after. In more detail, and assuming the heater metal is cobalt, the first annealing process can be carried out at 600° C. to 800° C. (about 680° C.) using a rapid thermal anneal processing system for about one minute (e.g., 20 to 80 seconds), while the second annealing process can then be can be carried out at 800° C. to 900° C. (about 850° C.) using the rapid thermal anneal processing system for about one minute (e.g., 20 to 80 seconds). Each of these annealing process steps can be carried out in an inert environment (e.g., nitrogen or argon) and/or in a vacuum to reduce contamination, oxidation, and other such undesirable results, depending on materials used and demands of application. After the first annealing process forms CoSi (initial salicide conversion), the substrate is subjected to a selective etch to remove any unwanted materials (including any unreacted cobalt). The CoSi remains intact. Etching can be carried out, for example, using a phosphoric acid/hydrogen peroxide bath at a temperature in the range of 20° C. to 120° C. until desired degree of etch is achieved (e.g., about 5 minutes to 100 minutes, depending on how much material is to be removed). The second annealing process then converts the CoSi to $CoSi_2$ (complete salicide conversion). A subsequent etch can then be performed to remove any remaining unwanted/unreacted material. In a more general sense, a typical CMOS FET fabrication salicide process (used to form salicided gates) can be used, followed by additional silicon oxide deposition, or additional oxide deposition to clad the circuit (in this example case, the waveguide structure). Once the salicide heaters are formed, standard CMOS flow may be used up to last metal contact layer applied.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method of making a silicon waveguide structure, the method comprising:
    depositing a hardmask layer on a substrate having a silicon layer on an oxide layer;
    etching the hardmask layer to provide a patterned hardmask defining patterns for a waveguide and at least one other structure;
    etching partway down the silicon layer with the patterned hardmask in place to form at least part of the waveguide and the at least one other structure;
    patterning a slab of the at least one other structure; and
    etching the remainder of the silicon layer down to the oxide layer with the patterned hardmask in place, thereby defining the slab of the at least one other structure and more of the waveguide.

2. The method of claim 1 wherein the hardmask layer includes a top layer that acts as a hardmask and a polish stop for chemical-mechanical planarization (CMP), and a bottom layer that acts as an etch stop for subsequent removal of the top hardmask layer.

3. The method of claim 2 wherein the top layer is a nitride layer and the bottom layer is an oxide layer.

4. The method of claim 1 wherein etching the hardmask layer to provide a patterned hardmask is performed with a pattern of photoresist in place, and etching partway down the silicon layer is carried out with both the patterned hardmask and photoresist in place.

5. The method of claim 4 wherein prior to patterning the slab, the method further comprises removing the photoresist used to pattern the hardmask.

6. The method of claim 1 wherein depositing the hardmask layer comprises depositing a bottom layer of silicon oxide, and then depositing a top layer of nitride.

7. The method of claim 6 wherein the waveguide is a channel waveguide and the at least one other structure is a ridge waveguide, the method further comprising:
    depositing a cladding layer over the ridge and channel waveguides; and
    planarizing the cladding layer using a CMP process, wherein the CMP process stops on or partially removes the top layer of nitride.

8. The method of claim 7 further comprising:
    removing the patterned hardmask using an etch process; and
    continuing with one or more CMOS based fabrication processes.

9. The method of claim 1 wherein the at least one other structure includes a salicide heater structure.

10. The method of claim 1 wherein etching the hardmask layer to provide a patterned hardmask and etching partway down the silicon layer are carried out as a single etching process.

11. A method of making a silicon waveguide structure, the method comprising:
    depositing a hardmask layer on a substrate having a silicon layer on an oxide layer, wherein the hardmask layer includes a top layer that acts as a hardmask and a polish stop for chemical-mechanical planarization (CMP), and a bottom layer that acts as an etch stop for subsequent removal of the top hardmask layer;
    etching the hardmask layer with a pattern of photoresist in place to provide a patterned hardmask defining waveguide patterns for a channel waveguide and a ridge waveguide;
    etching partway down the silicon layer with the patterned hardmask and photoresist in place to form at least part of the channel waveguide and the ridge waveguide;
    patterning a slab of the ridge waveguide using photoresist; and
    etching the remainder of the silicon layer down to the oxide layer with the patterned hardmask in place, thereby defining the slab of the ridge waveguide and more of the channel waveguide.

12. The method of claim 11 wherein the top layer is a nitride layer and the bottom layer is an oxide layer.

13. The method of claim 11 wherein prior to patterning the slab, the method further comprises removing the photoresist used to pattern the hardmask.

14. The method of claim 11 wherein depositing the hardmask layer comprises depositing a bottom layer of silicon oxide, and then depositing a top layer of nitride.

15. The method of claim 14 further comprising:
depositing a cladding layer over the ridge and channel waveguides; and
planarizing the cladding layer using a CMP process, wherein the CMP process stops on or partially removes the top layer of nitride.

16. The method of claim 15 further comprising:
removing the patterned hardmask using an etch process; and
continuing with one or more CMOS based fabrication processes.

17. The method of claim 11 wherein etching the hardmask layer to provide a patterned hardmask and etching partway down the silicon layer are carried out as a single etching process.

18. A method of making a silicon waveguide structure, the method comprising:
depositing a hardmask layer on a substrate having a silicon layer on an oxide layer, wherein the hardmask layer includes a top nitride layer and a bottom oxide layer;
etching the hardmask layer to provide a patterned hardmask defining waveguide patterns for a channel waveguide and a ridge waveguide;
etching partway down the silicon layer with the patterned hardmask in place to form at least part of the channel waveguide and the ridge waveguide;
patterning a slab of the ridge waveguide;
etching the remainder of the silicon layer down to the oxide layer with the patterned hardmask in place, thereby defining the slab of the ridge waveguide and more of the channel waveguide;
depositing a cladding layer over the ridge and channel waveguides; and
planarizing the cladding layer using a CMP process, wherein the CMP process stops on or partially removes the top nitride layer.

19. The method of claim 18 wherein etching the hardmask layer to provide a patterned hardmask is performed with a pattern of photoresist in place, and etching partway down the silicon layer is carried out with both the patterned hardmask and photoresist in place, and prior to patterning the slab, the method further comprises removing the photoresist used to pattern the hardmask.

20. The method of claim 18 further comprising:
removing the patterned hardmask using an etch process; and
continuing with one or more CMOS based fabrication processes.

* * * * *